United States Patent
Smith

(10) Patent No.: US 7,309,938 B1
(45) Date of Patent: Dec. 18, 2007

(54) ROTARY POWER CONVERTER

(76) Inventor: Kelly S. Smith, 18 Country Club Pl., Waxahachie, TX (US) 75165

( * ) Notice: Subject to any disclaimer, the term of this patent is extended or adjusted under 35 U.S.C. 154(b) by 0 days.

(21) Appl. No.: 11/443,778

(22) Filed: May 31, 2006

(51) Int. Cl.
*H02K 1/27* (2006.01)
*H02K 1/28* (2006.01)
*H02K 21/14* (2006.01)

(52) U.S. Cl. .................. 310/113; 310/112; 310/113; 310/114; 310/156.31; 318/254

(58) Field of Classification Search ............... 310/112, 310/113, 114
See application file for complete search history.

(56) References Cited

U.S. PATENT DOCUMENTS

| | | | |
|---|---|---|---|
| 996,762 A | | 7/1911 | Hertwig et al. |
| 1,413,158 A | * | 4/1922 | Caple .................. 310/112 |
| 1,504,608 A | * | 8/1924 | Cowin .................. 464/137 |
| 2,147,381 A | | 2/1939 | List et al. |
| 2,170,836 A | * | 8/1939 | Wooster .............. 310/102 R |
| 2,688,704 A | * | 9/1954 | Christenson ............... 290/4 C |
| 2,864,016 A | * | 12/1958 | Waltscheff ............ 310/102 R |
| 3,070,740 A | | 12/1962 | Chirgwin et al. |
| 3,200,324 A | | 8/1965 | Wagner |
| 3,403,313 A | * | 9/1968 | Pansini .................. 318/798 |
| 3,478,237 A | * | 11/1969 | Faxon .................. 310/68 R |
| 3,609,426 A | * | 9/1971 | Gaul .................. 322/4 |
| 3,931,535 A | * | 1/1976 | Roesel, Jr. .............. 310/113 |
| 4,087,698 A | * | 5/1978 | Myers .................. 307/84 |
| 4,144,468 A | | 3/1979 | Mourier |
| 4,168,459 A | | 9/1979 | Roesel, Jr. |
| 4,187,441 A | * | 2/1980 | Oney .................. 310/112 |
| 4,345,230 A | | 8/1982 | Chass |
| 4,358,693 A | * | 11/1982 | Palmer et al. .............. 310/46 |
| 4,663,581 A | | 5/1987 | Glennon |
| 4,724,348 A | * | 2/1988 | Stokes .................. 310/152 |
| 4,868,906 A | * | 9/1989 | Oilschlager, Jr. .......... 310/113 |

(Continued)

FOREIGN PATENT DOCUMENTS

JP 04285445 A * 10/1992

(Continued)

*Primary Examiner*—Darren Schuberg
*Assistant Examiner*—Naishadh N Desai
(74) *Attorney, Agent, or Firm*—Dan Brown Law Office; Daniel R. Brown

(57) ABSTRACT

A rotary power converter apparatus for coupling power between a prime driver and plural generators. The apparatus includes a frame having a first and second bearing aligned along an axis of rotation and a rotor assembly supported thereby. The rotor assembly includes a shaft fabricated from a light weight material that is rotatably supported along the axis of rotation by the first and second bearings. There is a prime-driver rotor assembly, that has a magnetic structure supported by a light weight non-magnetic alloy hub that is fixed to rotate with the shaft. There are also plural generator rotor assemblies, each having a permanent magnet structure supported by a light weight non magnetic alloy hub also fixed to rotate with the shaft. A prime driver stator assembly is fixedly supported by the frame and aligned concentric with the prime driver rotor assembly to enable magnetic coupling of power therewith. There are also plural generator stator assemblies fixedly supported by the frame, and each aligned concentric with one of the plural generator rotor assemblies to enable magnetic coupling of power therewith.

18 Claims, 9 Drawing Sheets

U.S. PATENT DOCUMENTS

| | | | |
|---|---|---|---|
| 5,184,040 A * | 2/1993 | Lim | 310/114 |
| 5,250,249 A * | 10/1993 | Garner | 264/176.1 |
| 5,274,291 A | 12/1993 | Clarke | |
| 5,786,640 A * | 7/1998 | Sakai et al. | 290/17 |
| 5,828,152 A * | 10/1998 | Takeda et al. | 310/156.19 |
| 5,955,809 A * | 9/1999 | Shah | 310/198 |
| 6,054,844 A | 4/2000 | Frank | 322/16 |
| 6,181,558 B1 * | 1/2001 | Gordon | 361/699 |
| 6,271,614 B1 * | 8/2001 | Arnold | 310/233 |
| 6,297,575 B1 * | 10/2001 | Yang | 310/266 |
| 6,552,454 B2 * | 4/2003 | Kern et al. | 310/89 |
| 6,639,337 B1 * | 10/2003 | Nakano | 310/113 |
| 6,873,071 B2 * | 3/2005 | Dooley | 310/68 C |
| 6,891,292 B2 * | 5/2005 | Raster et al. | 310/75 D |
| 6,909,215 B2 * | 6/2005 | Bryant | 310/114 |
| 6,909,263 B2 * | 6/2005 | Xu et al. | 322/29 |
| 6,975,045 B2 * | 12/2005 | Kurachi et al. | 290/44 |
| 6,995,485 B2 * | 2/2006 | Sezgin et al. | 310/68 D |
| 7,042,108 B2 * | 5/2006 | Farkas | 290/3 |
| 7,173,344 B2 * | 2/2007 | Yang | 290/4 R |
| 2005/0231058 A1 | 10/2005 | Down et al. | |
| 2006/0033392 A1 * | 2/2006 | Ritchey | 310/112 |
| 2006/0033393 A1 * | 2/2006 | Ritchey | 310/112 |
| 2006/0163969 A1 | 7/2006 | Nemoto et al. | |
| 2006/0244327 A1 * | 11/2006 | Kundel | 310/113 |

FOREIGN PATENT DOCUMENTS

| | | |
|---|---|---|
| JP | 2001119880 A * | 4/2001 |
| WO | WO 8706779 A1 * | 11/1987 |

* cited by examiner

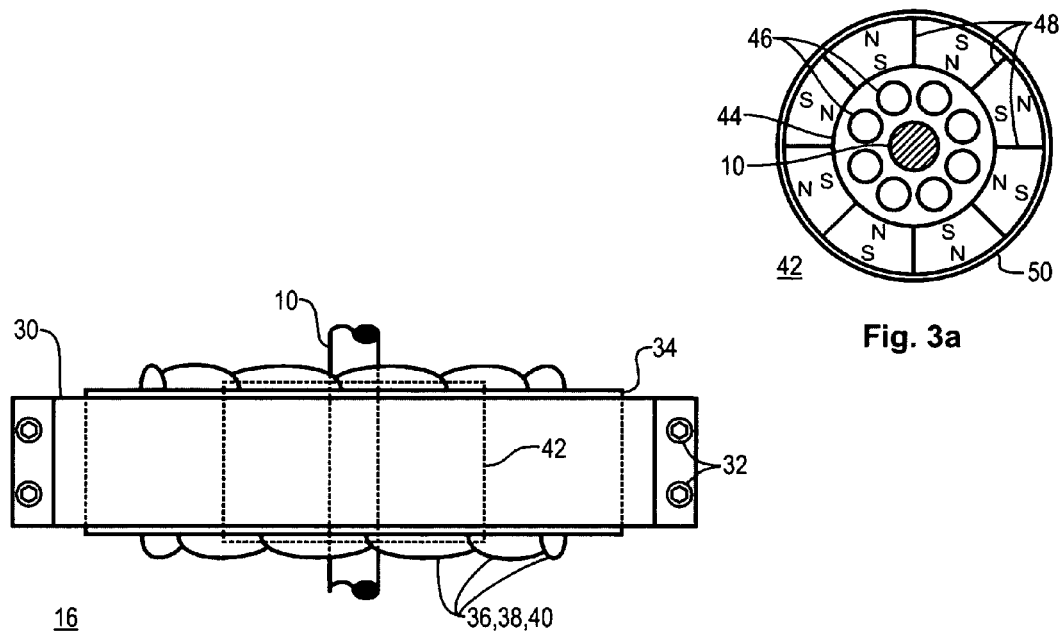
Fig. 3a
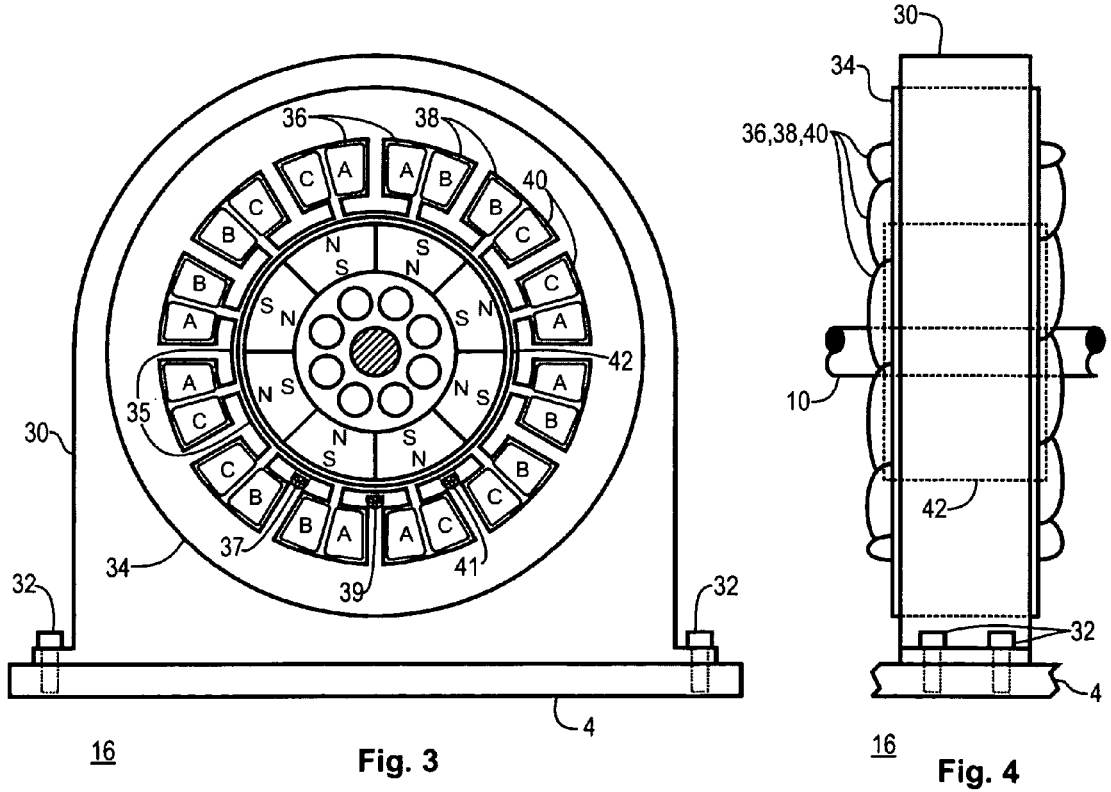
Fig. 5
Fig. 3
Fig. 4

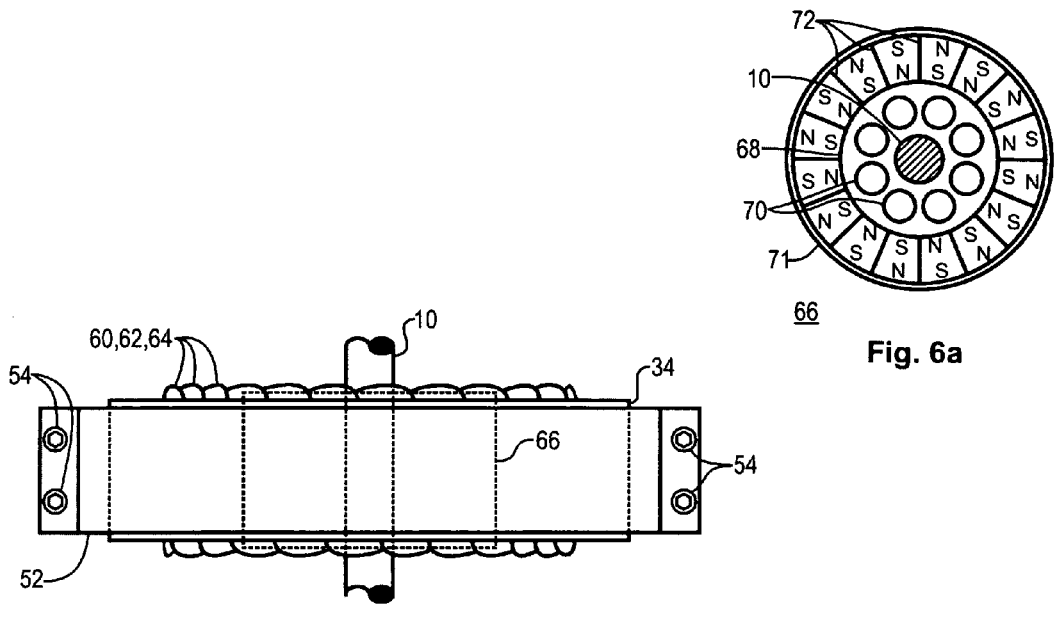
Fig. 6a
Fig. 8
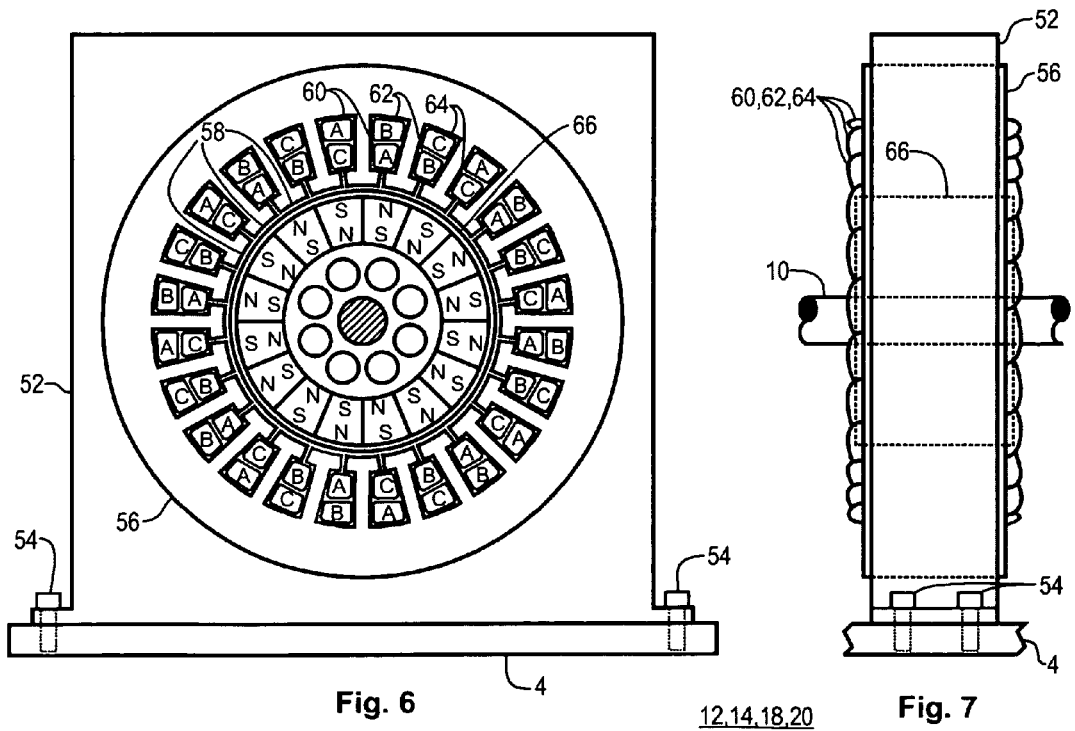
Fig. 6
Fig. 7

22,24,26,28

22,24,26,28

22,24,26,28

ROTARY POWER CONVERTER

BACKGROUND OF THE INVENTION

1. Field of the Invention

The present invention relates to motor-generator sets. More specifically, the present invention relates to rotary machines driven by electric motor prime drivers coupled through lightweight, low inertia, rotor assemblies to plural electric generators.

2. Description of the Related Art

Power conversion is useful for converting the power output from a prime driver to one or more driven devices, which may vary the nature of the converted power. In the case of electrical power, the motor-generator set is an example of a power converter. Input electrical power is converted to rotary mechanical power using an electric motor. The mechanical power is coupled to a generator, which converts mechanical power back to electrical power. The rotary power conversion process enables a range of power characteristics to be changed. Among these is voltage, amperage, direct versus alternating current, frequency, current flow, and so forth. Modern systems employ electrical power characteristics that are more varied than the historic direct current power and fixed voltage power distribution alternating current power, 60 Hz, for example. Systems today operate over a wide range of voltages and frequencies, and also employ non-linear electrical characteristics. Non-linear characteristics include pulsed power controllers, such as pulse wide, pulse period, pulse amplitude, and other non-sinusoidal waveforms. Solid state power converters exists as well, such as DC-to-DC converters and so forth.

Rotary power converters exhibit certain beneficial characterizes and limitations as well. A high degree of electrical isolation is possible due to the mechanical coupling of the converted power. The input and output characteristics of the converted power are very flexible, and power systems of mixed types can be coupled together. Issues related to mechanical efficiency affect overall performance, and traditional design philosophies limit system designs that have historically been employed. With advancements in electrical and electronic technology, rotary power converters have lagged behind emerging technology. Yet, the rotary power converter can solve problems heretofore addressed with other technologies. Thus there is a need in the art for an advanced rotary power converter that addresses modern demands for flexibility, efficiency and the integration of various power system characteristics.

SUMMARY OF THE INVENTION

The need in the art is addressed by the apparatus of the present invention. The present invention teaches a rotary power converter apparatus for coupling power between a prime driver and plural generators. The apparatus includes a frame having a first and second bearing aligned along an axis of rotation and a rotor assembly supported thereby. The rotor assembly includes a shaft fabricated from a light weight material that is rotatably supported along the axis of rotation by the first and second bearings. There is a prime-driver rotor assembly, that has a magnetic structure supported by a light weight non-magnetic alloy hub that is fixed to rotate with the shaft. There are also plural generator rotor assemblies, each having a permanent magnet structure supported by a light weight non magnetic alloy hub also fixed to rotate with the shaft. A prime driver stator assembly is fixedly supported by the frame and aligned concentric with the prime driver rotor assembly to enable magnetic coupling of power therewith. There are also plural generator stator assemblies fixedly supported by the frame, and each aligned concentric with one of the plural generator rotor assemblies to enable magnetic coupling of power therewith.

In a specific embodiment of the foregoing apparatus, the shaft is fabricated from a material selected from aluminum, aluminum alloy, type 6061-T6 aluminum alloy, graphite, graphite alloy, ceramic, nanotube reinforced polymers, and carbon composites. In another embodiment, the first and second bearing are graphite alloy bearings. In another embodiment, the graphite alloy is Graphalloy brand graphite and metal alloy formed from molten metal, graphite and carbon.

In a specific embodiment of the foregoing apparatus, the prime-driver rotor magnetic structure is a multi-pole permanent magnet. In a refinement, the permanent magnet is a Neodymium-Iron-Boron rare-earth magnet. In another embodiment, the permanent magnet is encased with a circumferential reinforcing band about the outer periphery. In another embodiment, the prime-driver rotor magnetic structure is a magnetic induction structure.

In a specific embodiment of the foregoing apparatus, the rotor assembly alloy hubs are crossed drilled to reduce weight. In another embodiment, the rotor assembly alloy hubs are fabricated from a material selected from aluminum, aluminum alloy, type 6061-T6 aluminum alloy, graphite, graphite alloy, ceramic, nanotube reinforced polymers, and carbon composites.

In a specific embodiment of the foregoing apparatus, the prime driver stator assembly is a multi-pole electromagnet assembly wound upon a laminate magnetic material core. In another embodiment, the plural generator stator assemblies are multi-pole electromagnets assemblies wound upon laminate magnetic material cores. In another embodiment, the prime driver and generator stators are multi-pole electromagnets, and the number of poles in the plural generator stator assemblies is greater than the number of poles in the prime driver stator assembly.

In a specific embodiment of the foregoing apparatus, plural isolation plates are interspersed between the prime driver stator assembly and the plural generator stator assemblies. In a specific embodiment, the plural isolation plates are lightweight thermally and electrically conductive plates effective at isolating electrical and radio frequency energy. The plural isolation plates may be CoolPoly brand isolation plates.

In a specific embodiment of the foregoing apparatus, the number of the plural generator rotor assemblies and the number of the plural generator stator assemblies is greater than three. In another embodiment, the prime-driver rotor assembly and the prime driver stator assembly are configured as a multi-pole brushless DC motor, the apparatus further includes a pulse width modulated DC servo drive coupled to energize the multi-pole brushless DC motor. In another specific embodiment, the outputs of the plural generator stator assemblies are combined in parallel or series to sum the power output therefrom. In a refinement to the foregoing apparatus, a portion of the power output from the plural generator stator assemblies is fed back to the prime driver stator assembly.

BRIEF DESCRIPTION OF THE DRAWINGS

FIG. 3 is an end view drawing of a prime driver rotor-stator assembly according to an illustrative embodiment of the present invention.

FIG. 4 is a side view drawing of a prime driver rotor-stator assembly according to an illustrative embodiment of the present invention.

FIG. 5 is a top view drawing of a prime driver rotor-stator assembly according to an illustrative embodiment of the present invention.

FIG. 6 is an end view drawing of a generator rotor-stator assembly according to an illustrative embodiment of the present invention.

FIG. 7 is a side view drawing of a generator rotor-stator assembly according to an illustrative embodiment of the present invention.

FIG. 8 is a top view drawing of a generator rotor-stator assembly according to an illustrative embodiment of the present invention.

DESCRIPTION OF THE INVENTION

Figure 1:
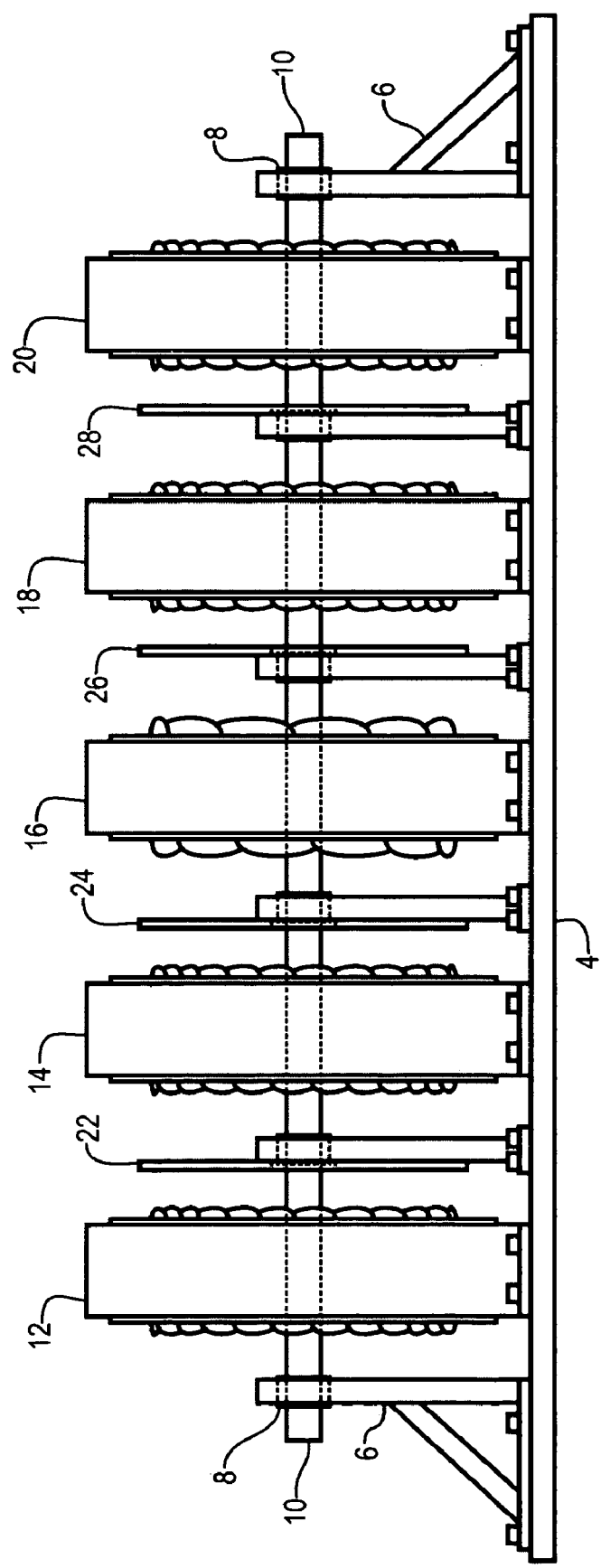
FIG. 1 is a side view drawing of motor-generator rotary power converter according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof, and additional fields in which the present invention would be of significant utility.

The present invention overcomes the problems in the prior art through teachings directed to an advanced rotary power converter that addresses modern demands for flexibility, efficiency and the integration of various power system characteristics in a compact, lightweight and power efficient apparatus. An illustrative embodiment of the invention is comprised of set of three or more permanent magnet rotors disposed upon a lightweight shaft supported by two or more bearings. Each rotor is supported on a lightweight, non magnetic hub and rotates within a stator having a wire wound iron laminate core, and each is configured to function as either a motor or a generator. The apparatus provides increased efficiency of the motor-generator energy transfer and the coupling of plural generators to a single prime driver along a single drive shaft.

The drive shaft and rotor hubs in the illustrative embodiment are fabricated from aluminum alloy to minimize weight and inertia of the rotating structure. In addition, excess material is removed from the hubs to minimize rotational mass. Two bearings rotatably support the drive shaft along a horizontal axis, however, additional bearings can be added to stabilize the rotating structure at speed and under load. The bearings are fabricated from a commercial material called "Graphalloy", which is a graphite/metal alloy that is formed from molten metal, graphite and carbon. Graphalloy is a uniform, solid, self-lubricating, bushing and bearing material. Graphalloy yields a low coefficient of friction, thereby minimizing resistance to the rotation of the drive shaft and rotor assembly. The bearings and drive shaft are supported above a base plate by two bearing mounts.

Each of the rotors is a permanent magnet rotor that is coupled to the drive shaft by a hub that is fabricated from type 6061-T6 aluminum alloy and cross drilled to remove unnecessary material, thereby minimizing weight and inertia of the rotating structure. The rotor magnets are all phenolic-coated high-gauss (rated at 50M and RIE 1100) Neodymium-Iron-Boron rare-earth magnets (hereinafter "NdFeB"). The magnets are cemented together to form a two inch diameter rotor, which is then bound by a type 303 stainless steel circumferential band. The arrangement and polarization of the magnets presents eight or sixteen poles along the circumference of each rotor. The motor rotor is configured with eight poles and the generator rotors are configured with sixteen poles each. The decreased number of poles in the prime driver, motor, produces a higher shaft velocity during operation. The illustrative embodiment employs one motor and four generators, however, the scope of the present invention contemplates a six generator structure and even an undetermined plural number of generators can be mounted along the single drive shaft.

The motor and generator stators in the illustrative embodiment are independently supported from a base plate, and each is centered on one of aforementioned rotors. Other types of support structures, housings and integrated machines which are known to those skilled in the art are equally applicable to the teachings herein. Each stator is fabricated from iron laminates stamped with the appropriate number of magnetic poles and wound in a three-phase sequence. The motor stator is wound with twelve poles and the generator stator is wound with twenty-four poles. The inside diameter of the laminate cores/poles is 2.245", allowing clearance for the 2.015" outside diameter rotors. The motor stator includes three Hall-effect sensors positioned to detect rotation for feedback to a prime drive controller.

The motor is disposed near the center of the drive shaft and the generators are positioned on either side thereof. Although other arrangements are possible and fall within the scope of the present invention. An isolating plate is disposed between the motor and each of the generators. In the illustrative embodiment, a "Coolpoly" brand polymer plate is positioned to isolate electrical and radio frequency energy from coupling between the motor and generator stages of the system. Coolpoly is a lightweight polymer that is thermally and electrically conductive. The main drive shaft of the prototype has sufficient length to support the requisite number of generators. Coolpoly is available from Cool Polymers, Inc., located in Warwick, R.I.

In the illustrative embodiment, the prime driver is a brushless direct current motor with a stator wound with a three-sequence progressive phase arrangement, and a permanent magnet rotor. The motor is driven by a three-phase pulse width modulated DC servo drive, which is a variable speed drive that gathers feedback from the three Hall effect sensors. In the illustrative embodiment, an Advanced Motion Controls, of Camarillo Calif., model B25A20AC servo controller is employed. However, any suitable motor drive could be employed in the invention, including simple connection to AC power mains using an AC induction motor as the prime driver of the system, or other electromechanical rotational machines that are known to those skilled in the art. The DC servo motor drive is powered from 120 Vac nominal wall outlet power in the illustrative embodiment.

The advancements in the art provided through the teachings of the present invention are applicable to a wide variety of motor-generator rotary power converter system arrangements. The bearings, shaft and rotor hubs are fabricated from very lightweight alloys, polymers, graphite, and other high strength and lightweight materials. Non-magnetic materials are used to enhance lightweight characteristics, which is contrary to conventional use of ferrites and other magnetically permeable materials. The lightweight rotor assembly enables operation of the apparatus at much higher rotational velocities than are conventionally applied. A circumferential reinforcing band is provided about the rotor magnets to enable them to withstand higher centrifugal forces. A single prime drive is coupled to plural generators through a single, solid, drive shaft that is supported on low friction bearings. The apparatus of the present invention is widely sealable from huge machines capable of converting tens of megawatts to "nano" sized devices that can be incorporated into man-portable appliances. The outputs of the plural generators can be wound for varying voltages and currents, including AC, DC, and non-linear waveforms, which can be integrated in series, parallel of other combinations, as are known to those skilled in the art Battery reserve power can be integrated into the system to sustain operation when mains power is unavailable, and the batteries can be charged by one or more of the plural generators in a feedback configuration. The advantageous aspects of the apparatus of the present invention are realized through the use of lightweight rotor components and low friction assemblies with multiple rotor-stator assemblies driven on a single shaft. This approach enables multiple generator sets to be simultaneously driven by a single prime driver, with low inertia characteristics advantageously employed to allow compact proportions, high-speed operation with rapid acceleration. Multiple outputs can be independently configured to the requisite voltage and phase characteristics.

Figure 2:
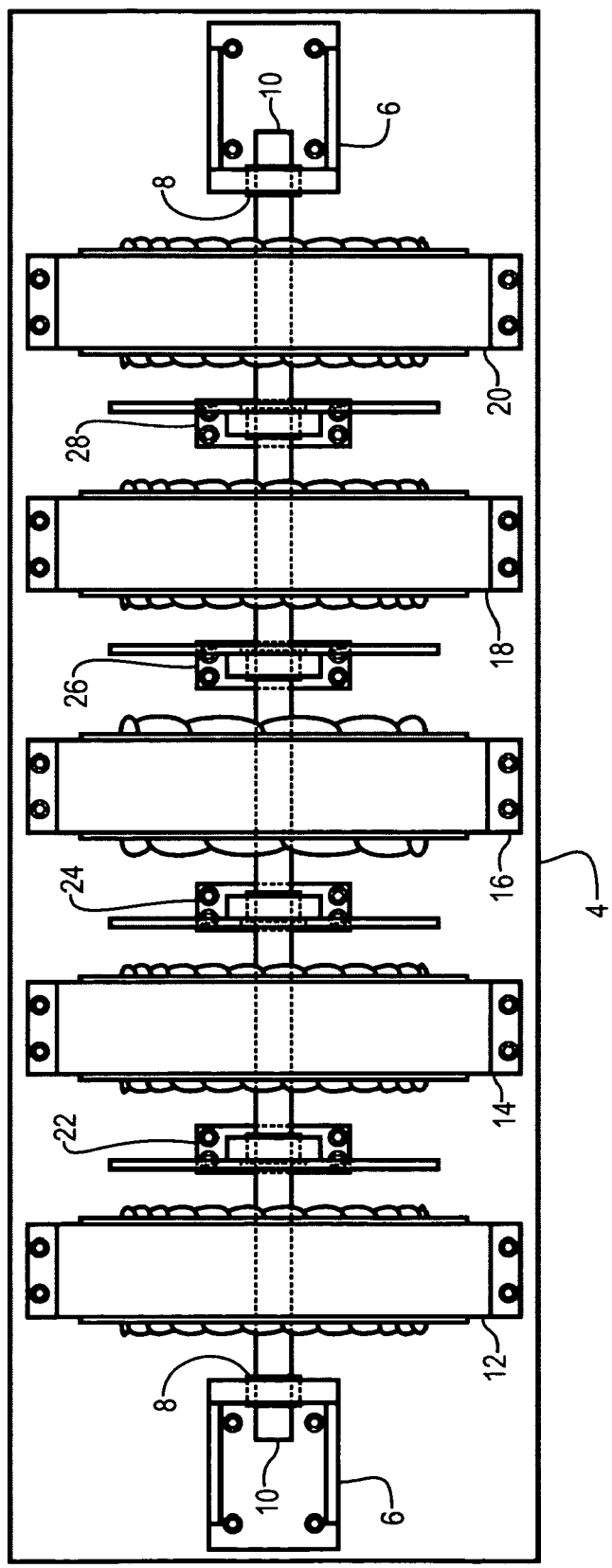
FIG. 2 is a top view drawing of motor-generator rotary power converter according to an illustrative embodiment of the present invention.

Reference is directed to FIG. 1 and FIG. 2, which are a side view and top view drawing, respectively, of motor-generator rotary power converter 2 according to an illustrative embodiment of the present invention. The illustrative embodiment is shown in prototype form, and therefore employs an open frame structure built-up from a base plate 4. A pair of bearing mounts 6 support a pair of rotary bearings 8 along an axis of rotation of a drive shaft 10. The base plate 4 and bearing mounts 6 are fabricated from lightweight aluminum alloy, which also exhibit excellent heat conduction characteristics. The bearings 8 are Graphalloy brand graphite alloy bearings that exhibit very low friction and excellent thermal characteristics. The bearings 8 are supported by the bearing mounts 6, which in turn, rotationally support the drive shaft 10. Five rotor-stator assemblies 12, 14, 16, 18, 20 are disposed along the length of drive shaft 10. Rotor-stator assembly 16 is the prime driver of the shaft 10, and, rotor-stator assemblies 12, 14, 18, 20 are configured as permanent magnet generators. Because of the intense electrical and magnetic fields associated with operation of the rotor-stator assemblies, the present inventions employs isolation assemblies 22, 24, 26, 28 disposed between each pair of adjacent rotor-stator assemblies 12, 14, 16 18, 20. The rotor-stator assemblies and isolation assemblies will be more fully descried hereinafter.

Reference is directed to FIG. 3, FIG. 4, and FIG. 5, which are an end view, side view, and top view drawing, respectively of the prime driver rotor-stator assembly 16 according to an illustrative embodiment of the present invention. FIG. 3a is an end view detail of the rotor assembly 42 used in the rotor-stator assembly 16. The prime driver 16 is configured as an eight-pole brushless DC motor that employs a three-phase, twelve-pole stator in the illustrative embodiment. The stator consists of a laminated iron magnetic core 34 that is stamped for twelve electromagnetic poles 35. The poles 35 are energized with 'A', 'B', and 'C' phase windings 36, 38, 40 that are wound about the poles 35 in a repeating sequence. The iron laminate core 34 is supported above the base plate 4 by stator support 30, which is fabricated from lightweight aluminum alloy in the illustrative embodiment. The stator support 30 is attached to the base plate 4 using threaded fasteners 32. The rotor assembly 42 is rotatably supported within the stator core 34 by the drive shaft 10. Three Hall effect sensors 37, 39, 41 are positioned in alignment with the three phases for providing feedback to a DC servo drive controller as to the position and velocity of the rotor during operation.

FIG. 3a is a detailed side view of the rotor assembly 42. An aluminum rotor hub 44 is attached to drive shaft 10 and supports the eight rotor magnets 48. The rotor magnets 48 are cemented together and to the rotor hub 44. In addition, a circumferential band 50 holds the plural magnets 48 against centrifugal force during high-speed operation. The band 50 is fabricated from type 303 stainless steel in the illustrative embodiment, however other suitable high strength materials can be employed, as will be appreciated by those skilled in the art. In the illustrative embodiment, the shaft 10 and hub 44 are fabricated from type 6061-T6 aluminum alloy and are cross drilled with plural holes 46 to reduce mass. Other lightweight and non-magnetic materials are contemplated as well, including aluminum, aluminum alloys, graphite, graphite alloy, ceramic, nanotube reinforced polymers, and carbon composites, and other similar materials known to those skilled in the art. The rotor hub 44 is effective at conducting heat away form from the rotor stator assembly 16 during operation. The hub 44 may be attached to the shaft 10 using a key-set, splined, compression, set-screw, cement, or other means as are known to those skilled in the art.

Reference is directed to FIG. 6, FIG. 7, and FIG. 8, which are an end view, side view, and top view drawing, respectively of the generator rotor-stator assemblies 12, 14, 18, 20 according to an illustrative embodiment of the present invention. FIG. 6a is an end view detail of the rotor assembly 66 used in the generator assemblies. The generators 12, 14, 18, 20 are configured as sixteen pole three-phase permanent magnet generators that employ a three-phase, twenty-four pole stator in the illustrative embodiment. The stator consists of a laminated iron magnetic core 56 that is stamped for twenty-four electromagnetic poles 58. The poles 58 are energized with 'A', 'B', and 'C' phase windings 60, 62, 64 that are wound about the poles 58 in a repeating sequence. The iron laminate core 56 is supported above the base plate 4 by stator support 52, which is fabricated from lightweight aluminum alloy in the illustrative embodiment. The stator support 52 is attached to the base plate 4 using threaded fasteners 54. The rotor assembly 66 is rotatably supported within the stator core 56 by the drive shaft 10.

FIG. 6a is a detailed side view of the rotor assembly 66. An aluminum rotor hub 68 is attached to drive shaft 10 and supports the sixteen rotor magnets 72. The rotor magnets 72 are cemented together and to the rotor hub 68. In addition, a circumferential band 71 holds the plural magnets 72 against centrifugal force during high-speed operation. The band 71 is fabricated from type 303 stainless steel in the illustrative embodiment, however other suitable high strength materials can be employed, as will be appreciated by those skilled in the art. In the illustrative embodiment, the shaft 10 and hub 68 are fabricated from type 6061-T6 aluminum alloy and are cross drilled with plural holes 70 to reduce mass. Other lightweight and non-magnetic materials are contemplated as well, including aluminum, aluminum alloys, graphite, graphite alloy, ceramic, nanotube reinforced polymers, and carbon composites, and other similar materials known to those skilled in the art. The rotor hub 68 is effective at conducting heat away form the rotor stator assemblies 12, 14, 18, 20 during operation. The hub 68 may be attached to the shaft 10 using a key-set, spline, compression, set-screw, cement, or other means as are known to those skilled in the art.

Figure 9:
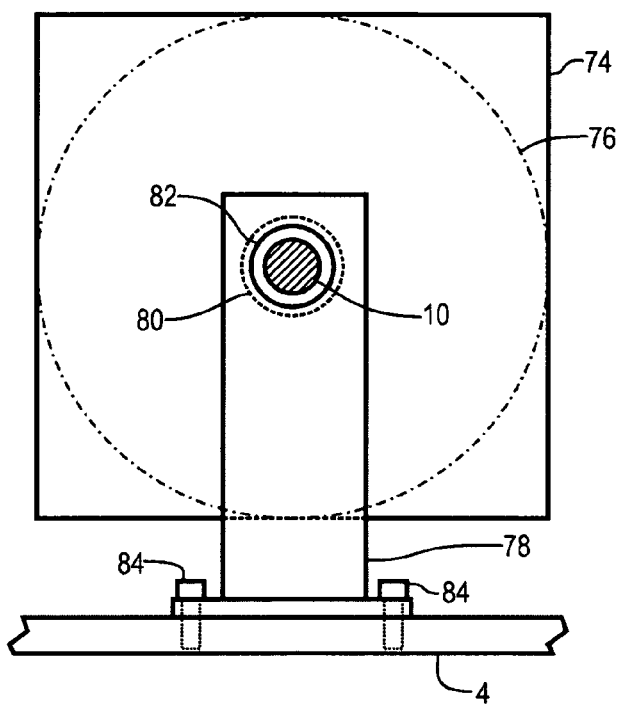
FIG. 9 is an end view drawing of an isolation assembly according to an illustrative embodiment of the present invention.
Figure 10:
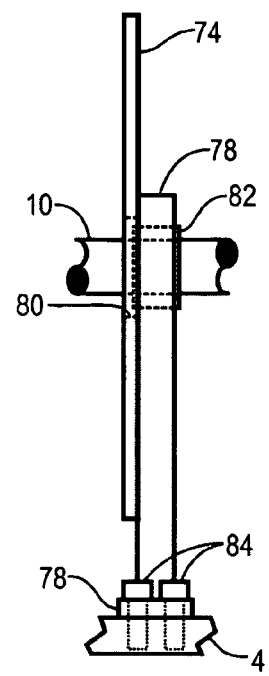
FIG. 10 is a side view drawing of an isolation assembly according to an illustrative embodiment of the present invention.
Figure 11:
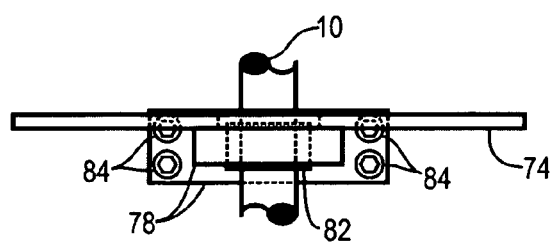
FIG. 11 is a top view drawing of an isolation assembly according to an illustrative embodiment of the present invention.

Reference is directed to FIG. 9, FIG. 10, and FIG. 11, which are an end view, side view and top view drawing, respectively, of the isolation assemblies 22, 24, 26, 28 according to the illustrative embodiment of the present invention. Isolation is achieved using a CoolPoly plate 74, described hereinbefore. The plate 74 is sized to cover the stator windings. The plate 74 may be re-shaped 76 to suite the physical requirement of the apparatus housing, etc. In the illustrative embodiment, the plate 74 is attached to an isolation support 78. The isolation plate 74 has a hole 80 formed therein to clear the shaft 10 and other components of the apparatus. The isolation plate support 78 is attached to the base plate 4 using threaded fasteners 84. In the illustrative embodiment, the isolation plate support 78 is fabricated from type 6061 T6 aluminum alloy. In the illustrative embodiment, each of the isolation plate supports 78 also serves as an intermediate bearing support. Thus, an intermediate Graphalloy bearing 82 is supported by each isolation plate support 78. The additional bearings 82 serve to stabilize the drive shaft 10 during high speed and high torque operation of the power converter.

Figure 12:
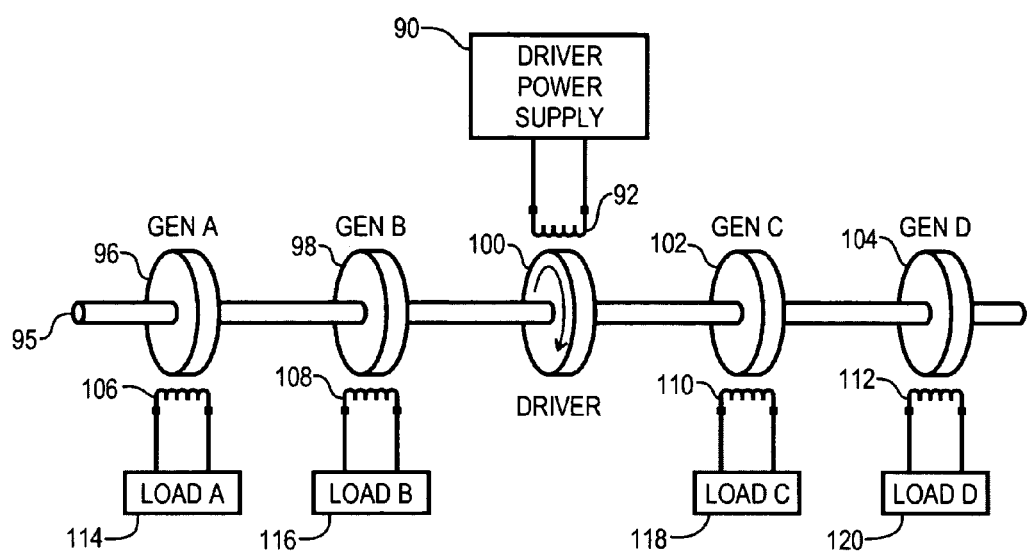
FIG. 12 is a functional diagram of a rotary power converter according to an illustrative embodiment of the present invention.

Reference is directed to FIG. 12, which is a functional diagram of a rotary power converter according to an illustrative embodiment of the present invention. FIG. 12 is a generalized view of a power converter according to the teachings of the present invention. The drive shaft 95 is forced to rotate by a prime driver rotor 100, which is magnetically driven by a prime drive stator winding 92. The stator winding 92 is powered be a prime driver power supply 90. Virtually any electromotive rotor-stator technology known to those skilled in the art is applicable to the teachings of the present invention. The rotor 100 may be of the permanent magnet variety or may be an induced magnetism type of rotor, such as are used in alternating current induction motors, including squirrel cage motors. The shaft 95 urges the rotation of plural generator rotors 96, 98, 102, 104. Each of these rotors is magnetically coupled to a corresponding stator coil 106, 108, 110, 112. Each of these stator coils is electrically coupled to a corresponding load 114, 116, 118, 120. The lightweight characteristics of the shaft and rotors, through the use of non-magnetic materials enables high speed operation, low rotational moment, and quick acceleration and adaptation to varying loads. The present invention contemplates the use of a wide range of stator technologies known to those skilled in the art including HTS stators, Meschcon stators, E-Cycle Stators, and Thingap stators. Both magnetic core and coreless stators may be employed.

Figure 13:
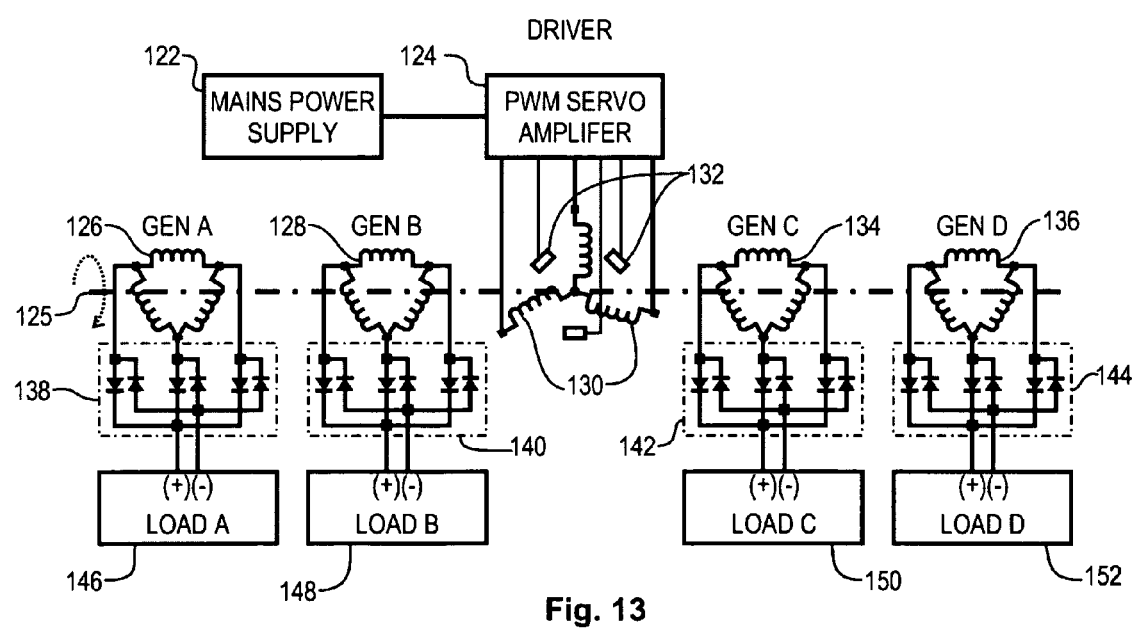
FIG. 13 is a functional diagram of a rotary power converter using three-phase stator assemblies according to an illustrative embodiment of the present invention.

Reference is directed to FIG. 13, which is a functional diagram of a rotary power converter using three-phase stator assemblies according to an illustrative embodiment of the present invention. FIG. 13 generally corresponds to the earlier described illustrative embodiment, with the addition of components to enable direct current loads. The shaft 125 is driven by a prime driver rotor-stator 130. The rotor-stator used three-phase windings with corresponding Hall effect sensors 132. All of these elements are coupled to an Advanced Motion Controls model B25A20AC Series Brushless Servo Amplifier 124. The servo-amp 124 is supplied by AC power from the mains power supply 122. The servo amp 124 enables variable speed drive of the prime driver 130 under synchronous operation by virtue of the Hall effect sensors 132 angular position feedback. Hall effect sensors are an illustrative application, other position sensing technologies can be employed as well, including optical-detectors and other sensors known to those skilled in the art. The shaft 125 couples power to the plural generators 126, 128, 134, 136, which are labeled "GEN A", "GEN B", "GEN C", and "GEN D", respectively. Each generator is a three-phase AC permanent magnet generator. Three phase bridge rectifiers 138, 140, 142, 144 are coupled to the respective generators, and provide direct current to the corresponding loads. The loads 146, 148, 150, 152 are labeled "LOAD A", "LOAD B", "LOAD C", and "LOAD D", corresponding to the generator names. Any type of DC load can be driven by the system.

Figure 14:
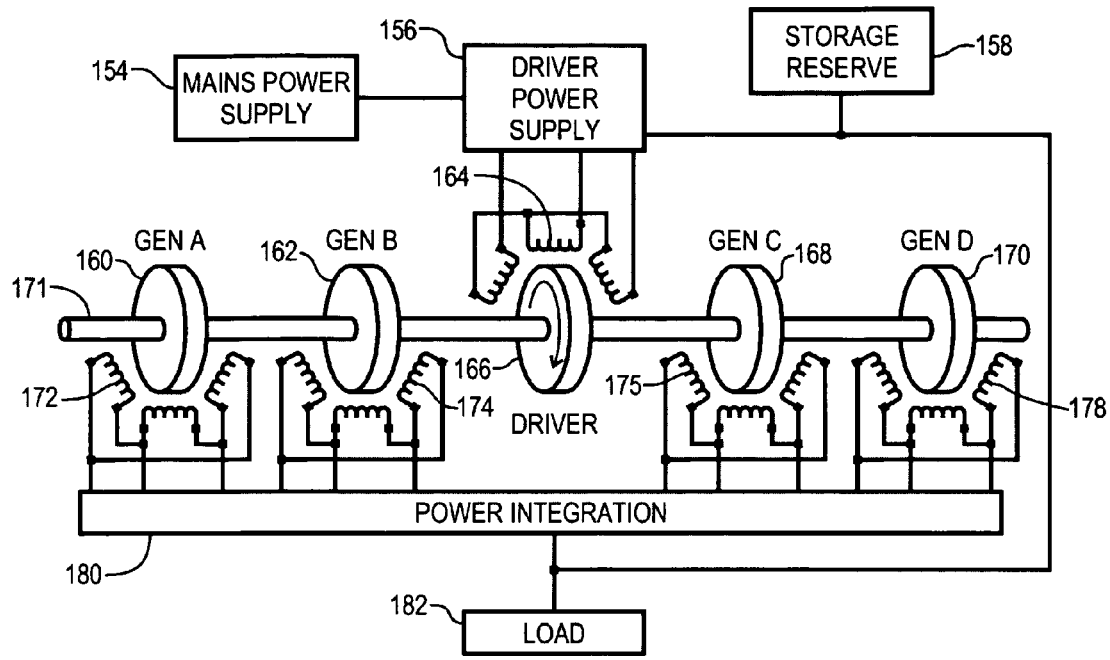
FIG. 14 is a functional diagram of a rotary power converter using power integration and feedback according to an illustrative embodiment of the present invention.

Reference is directed to FIG. 14, which is a functional diagram of a rotary power converter using power integration and feedback according to an illustrative embodiment of the present invention. FIG. 12 is a generalized view of a three-phase power converter according to an illustrative embodiment of the present invention. The drive shaft 171 is forced to rotate by a prime driver rotor 166, which is magnetically driven by prime drive stator windings 164. The stator windings 164 are powered be a prime driver power supply 156. The shaft 171 urges the rotation of plural generator rotors 160, 162, 168, 170. Each of these rotors is magnetically coupled to a corresponding stator coil 172, 174, 175, 178. Each of these stator coils is electrically coupled to a load 182 through a power integration circuit 180. The power integration circuit 180 combines the power output from the generators to drive the load 182 and to feedback power to the driver power supply 156. A power reserve 158 is tapped to the feedback line and enables interruption of mains power supply 154. The power reserve may be a storage battery bank, a capacitor bank, an inductor bank, and inertia storage device, or other electric power storage means that is known to those skilled in the art.

Figure 15:
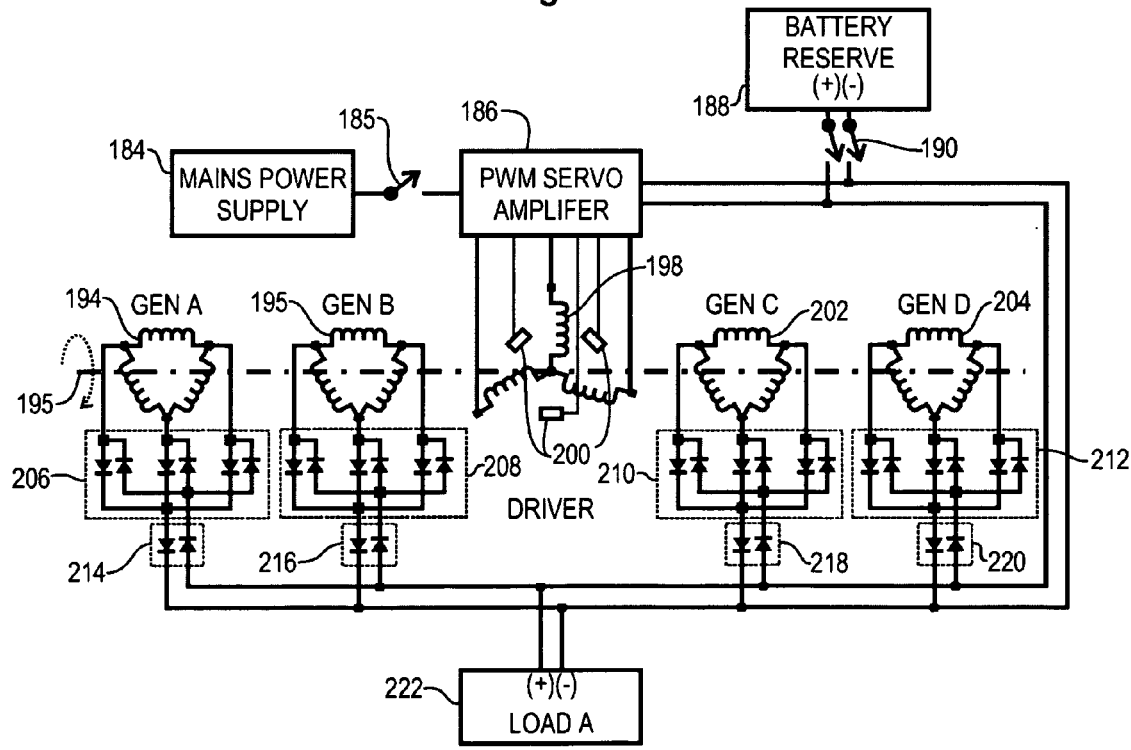
FIG. 15 is a functional diagram of a rotary power converter using power rectification and feedback according to an illustrative embodiment of the present invention.
Figure 16:
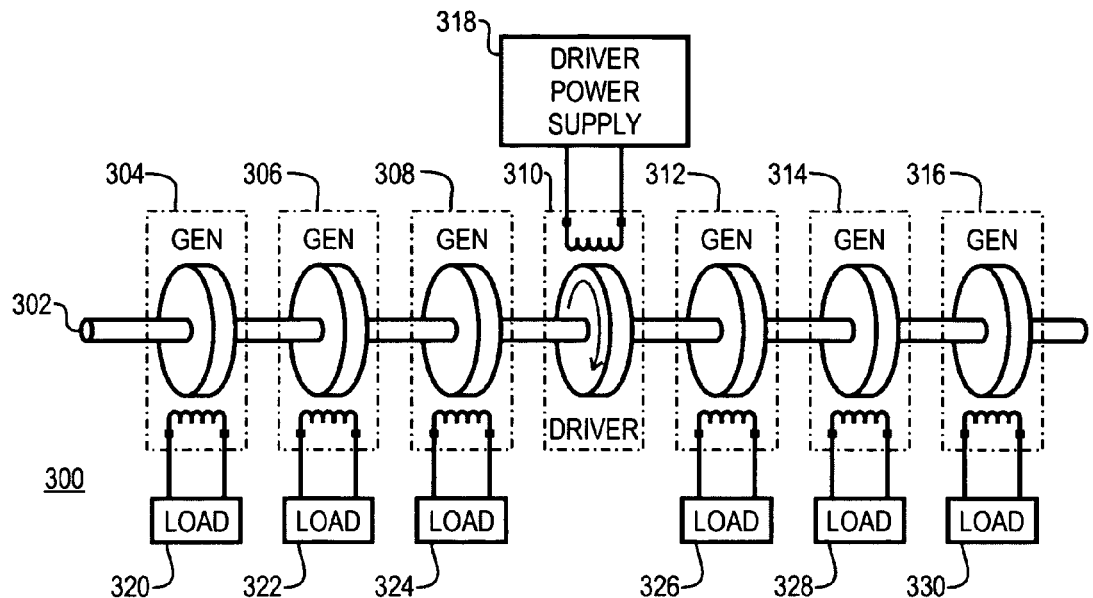
FIG. 16 is a functional diagram of a rotary power converter according to an illustrative embodiment of the present invention.

Reference is directed to FIG. 15, which is a functional diagram of a rotary power converter using power rectification and feedback according to an illustrative embodiment of the present invention. FIG. 15 generally corresponds to the earlier described illustrative embodiment, with the addition of components to isolate the load and to switch the mains power and battery reserve power. The shaft 195 is driven by a prime driver rotor-stator 198. The rotor-stator used three-phase windings with corresponding Hall effect sensors 200. All of these elements are coupled to an Advanced Motion Controls model B25A20AC Series Brushless Servo Amplifier 186. The servo-amp 186 is supplied by AC power from the mains power supply 184 though a power switch 185. The servo amp 186 enables variable speed drive of the prime driver 198 under synchronous operation by virtue of the Hall effect sensors 200 angular position feedback. The shaft 195 couples power to the plural generators 194, 195, 202, 204, which are labeled "GEN A", "GEN B", "GEN C", and "GEN D", respectively. Each generator is a three-phase AC permanent magnet generator. Three phase bridge rectifiers 206, 208, 210, 212 are coupled to the respective generators, and provide direct current output. Isolation rectifiers 214, 216, 28, 220 prevent power feedback between the other components to avoid power loss through motoring of the generators. The four outputs are combined and coupled to the direct current load 222. Any type of DC load can be driven by the system. A portion of the output power is fed back to the servo drive 186. Reserve battery 188 is coupled via switch 190 to the feedback loop, thereby enabling battery reserve operation when mains power or sufficient feedback power is unavailable.

Reference is directed to Figure, which 16 is a functional diagram of a rotary power converter 300 according to an illustrative embodiment of the present invention. The illustrative embodiment demonstrates a characteristic of the advancement in the art through utilization of low-mass, lightweight materials and low friction bearings, which is the use of a remarkable number or rotor-stator assemblies in a single converter apparatus. A single shaft 302 supports seven rotor-stator assemblies 304, 306, 308, 310, 312, 314, 316. The central rotor stator assembly 310 is configured as a driver unit, which is driven by a driver power supply 318. The remaining rotor stator assemblies are all configured as generators 304, 306, 308, 312, 314, 316. Each of these generators is coupled to a corresponding load 320, 322, 324, 326, 328, 330, respectively. Each of these generators and loads can be independently configured to provide a requisite power demand, including direct current at various voltages, alternative current at various voltages, various numbers of phases, and any other power configuration known to those skilled in the art.

Figure 17:
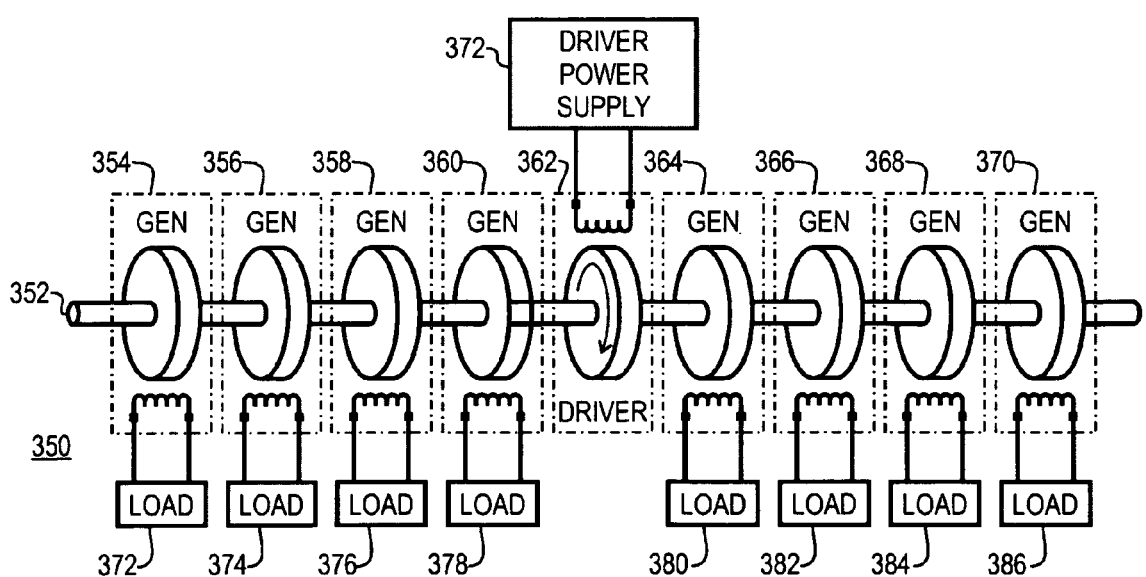
FIG. 17 is a functional diagram of a rotary power converter according to an illustrative embodiment of the present invention.

Reference is directed to FIG. 17, which is a functional diagram of a rotary power converter 350 according to an illustrative embodiment of the present invention. The embodiment in FIG. 17 takes the plural rotor-stator assembly aspect of the present invention to an even more flexible configuration, which is suitable for scaling to very compact proportions. A single drive shaft 352 rotatably supports nine rotor-stator assemblies 354, 356, 358, 360, 362, 364, 366, 368, 370. The central rotor stator assembly 362 is configured as a driver unit, which is driven by a driver power supply 372. The remaining rotor stator assemblies are all configured as generators 354, 356, 358, 360, 364, 366, 368, 370. Each of these generators is coupled to a corresponding load 372, 374, 376, 378, 380, 382, 384, 386, respectively. Each of these generators and loads can be independently configured to provide a requisite power demand.

Figure 18:
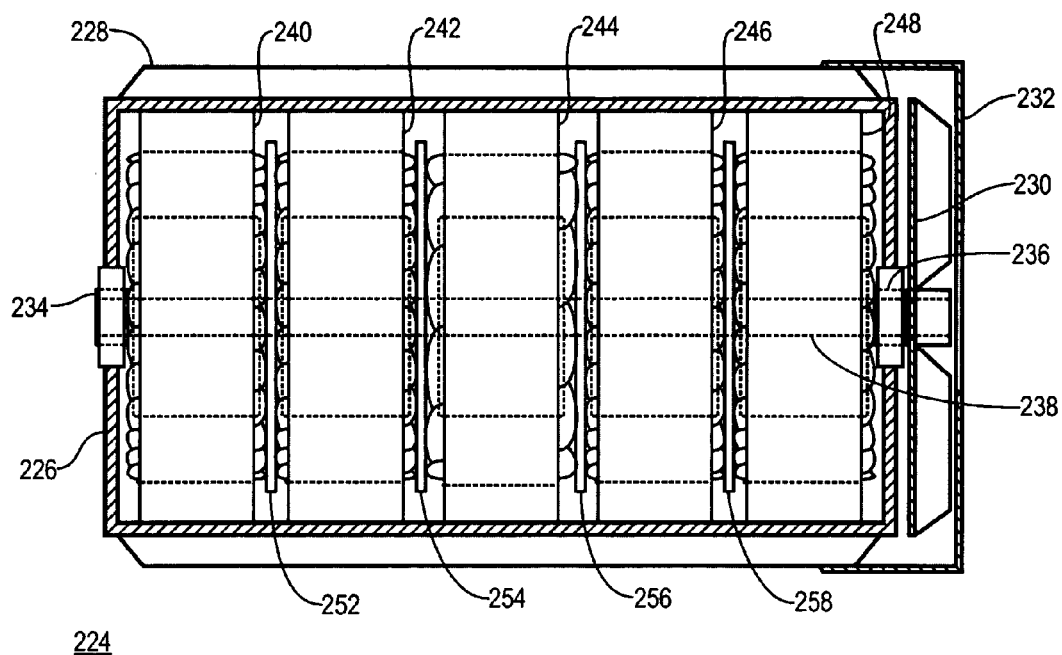
FIG. 18 is a side sectional view of a rotary power converter according to an illustrative embodiment of the present invention.
Figure 19:
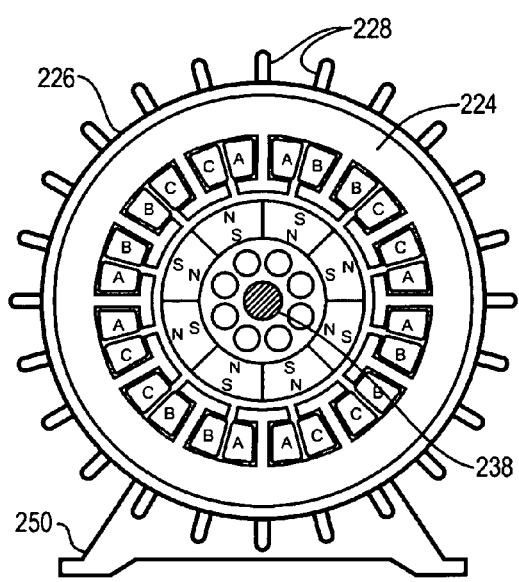
FIG. 19 is an end sectional view of a rotary power converter according to an illustrative embodiment of the present invention.
Figure 20:
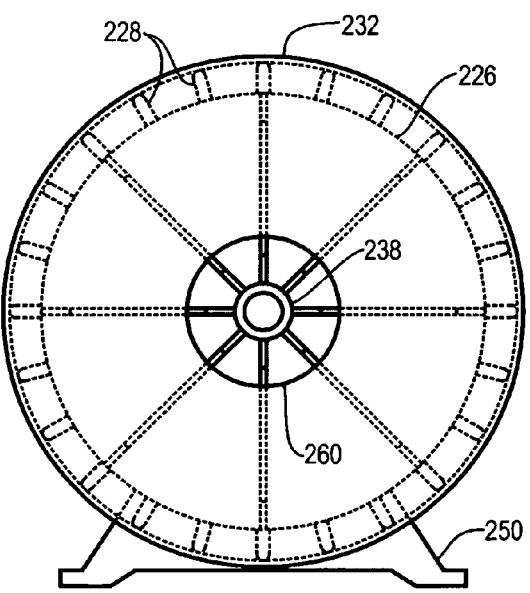
FIG. 20 is an end view of a rotary power converter according to an illustrative embodiment of the present invention.

Reference is directed to FIG. 18, FIG. 19, and FIG. 20, which are a side sectional view, end sectional view and end view, respectively, of a rotary power converter 224 according to an illustrative embodiment of the present invention. The embodiment shown is suitable for industrial application, and is exemplary of the many possible configurations achievable through utilization of the teachings herein. An industrial enclosure 226 has plural cooling fins 228 extending from the exterior thereof. The drive shaft 238 extends through the end wall of the enclosure 226 and drives a cooling fan 230. A fan shroud 232 directs the cooling air from an inlet hole 260 in the fan shroud 232 and over the cooling fins 228. The plural rotor-stator assemblies 240, 242, 2444, 246, 248 are in thermal contact with the interior of the housing 226, and thereby conduct heat away from the rotor-stator assemblies during operation. Plural isolation plates 252, 254, 256, 258 are disposed between the rotor-stator assemblies so as to provide the aforementioned isolation. A very space-efficient and compact apparatus is thereby achieved.

Thus, the present invention has been described herein with reference to particular embodiments for particular applications. Those having ordinary skill in the art and access to the present teachings will recognize additional modifications, applications and embodiments within the scope thereof.

It is therefore intended that the appended claims cover any and all such applications, modifications and embodiments within the scope of the present invention.

What is claimed is:

1. A rotary power converter apparatus for coupling power between a prime driver and plural generators, comprising:
   a frame having a first and second bearing aligned along an axis of rotation;
   a rotor assembly, further comprising:
      a shaft fabricated from a light weight material, and rotatably supported along said axis of rotation by said first and second bearings;
      a prime-driver rotor assembly, having a magnetic structure supported by a light weight non-magnetic alloy hub fixed to rotate with said shaft;
      plural generator rotor assemblies, each having a permanent magnet structure supported by a light weight non magnetic alloy hub fixed to rotate with said shaft;
   a prime driver stator assembly fixedly supported by said frame and aligned concentric with said prime driver rotor assembly to enable magnetic coupling of power therewith;
   plural generator stator assemblies fixedly supported by said frame, and each aligned concentric with one of said plural generator rotor assemblies to enable magnetic coupling of power therewith, and wherein
      said prime-driver rotor assembly and said prime driver stator assembly are configured as a multi-pole brushless DC motor, and
   a pulse width modulated DC servo drive coupled to energize said multi-pole brushless DC motor.

2. The apparatus of claim 1 wherein said shaft is fabricated from a material selected from aluminum, aluminum alloy, type 6061-T6 aluminum alloy, graphite, graphite alloy, ceramic, nanotube reinforced polymers; and carbon composites.

3. The apparatus of claim 1 wherein said first and second hearing are graphite alloy bearings.

4. The apparatus of claim 3 wherein said graphite alloy is a graphite and metal alloy formed from molten metal, graphite and carbon.

5. The apparatus of claim 1 wherein said prime-driver rotor magnetic structure is a multi-pole permanent magnet.

6. The apparatus of claim 5 wherein said permanent magnet is a Neodymium-Iron-Boron rare-earth magnet.

7. The apparatus of claim 1 wherein said permanent magnet is encased with a circumferential reinforcing band about the outer periphery.

8. The apparatus of claim 1 wherein said prime-driver rotor magnetic structure is a magnetic induction structure.

9. The apparatus of claim 1 wherein said rotor assembly alloy hubs are cross drilled to reduce weight.

10. The apparatus of claim 1 wherein said rotor assembly alloy hubs are fabricated from a material selected from aluminum, aluminium alloy, type 6061-T6 aluminum alloy, graphite, graphite alloy, ceramic, nanotube reinforced polymers, and carbon composites.

11. The apparatus of claim 1 wherein said prime driver stator assembly is a multi-pole electromagnet assembly wound upon a laminate magnetic material core.

12. The apparatus of claim 1 wherein said plural generator stator assemblies are multi-pole electromagnets assemblies wound upon laminate magnetic material cores.

13. The apparatus of claim 1 wherein said prime driver and generator stators are multi-pole electromagnets, and wherein the number of poles in said plural generator stator assemblies is greater than the number of poles in said prime driver stator assembly.

14. The apparatus of claim 1, further comprising:
    plural isolation plates interspersed between said prime driver stator assembly and said plural generator stator assemblies.

15. The apparatus of claim 14 wherein said plural isolation plates are lightweight thermally and electrically conductive plates effective at isolating electrical and radio frequency energy.

16. The apparatus of claim 1 wherein the number of said plural generator rotor assemblies and the number of said plural generator stator assemblies is greater than three.

17. The apparatus of claim 1 wherein the outputs of said plural generator stator assemblies are combined in parallel or series to sum the power output therefrom.

18. The apparatus of claim 1 wherein a portion of the power output from said plural generator stator assemblies is fed back to said prime driver stator assembly.

* * * * *